United States Patent [19]

Simar, Jr.

[11] Patent Number: 5,511,146
[45] Date of Patent: Apr. 23, 1996

[54] EXCITORY AND INHIBITORY CELLULAR AUTOMATA FOR COMPUTATIONAL NETWORKS

[75] Inventor: Laurence R. Simar, Jr., Richmond, Tex.

[73] Assignee: Texas Instruments Incorporated, Dallas, Tex.

[21] Appl. No.: 259,373

[22] Filed: Jun. 14, 1994

Related U.S. Application Data

[63] Continuation of Ser. No. 721,750, Jun. 26, 1991, abandoned.

[51] Int. Cl.[6] ........................................ G06F 7/38
[52] U.S. Cl. ........................ 395/24; 395/27; 364/276.6
[58] Field of Search ........................ 395/24, 27, 97, 395/800; 364/750.5, 717

[56] References Cited

U.S. PATENT DOCUMENTS

| | | | |
|---|---|---|---|
| 4,860,236 | 8/1989 | McLeod et al. | 364/717 |
| 4,884,232 | 11/1989 | Schlunt | 364/754 |
| 4,893,255 | 1/1990 | Tomlinson, Jr. | 395/24 |
| 4,961,159 | 10/1990 | McLeod et al. | 364/717 |
| 5,032,865 | 7/1991 | Schlunt | 364/750.5 |
| 5,140,670 | 8/1992 | Chua et al. | 395/24 |

*Primary Examiner*—Krisna Lim
*Attorney, Agent, or Firm*—Gerald E. Laws; Richard Donaldson; Jay Cantor

[57] ABSTRACT

A set of three cellular automata—the E-Cell, the I-Cell, and the D-Node—can be used to design and assemble parallel processing networks for such applications as signal processing and artificial intelligence. The E-Cell (FIG. 1a) is an excitory cell. The I-Cell (FIG. 2a) is an inhibitory cell. The D-Node (FIG. 3) is a combination of E-Cells and I-Cells. The use of the cellular automata is illustrated in three exemplary applications: a lateral inhibition network (FIG. 5b), a tree-search network (FIG. 6b), and a graph-search network (FIG. 7e). In particular, the tree-search and graph-search networks are implemented using the same structure as the tree or graph.

17 Claims, 4 Drawing Sheets

FIG. 6a
TREE

FIG. 6b
E-CELL NETWORK

DIRECTED GRAPH
BUILDING BLOCK

D=CELL
IMPLEMENTATION

FIG. 7e

DIRECTED GRAPH

D-CELL IMPLEMENTATION

EXCITORY AND INHIBITORY CELLULAR AUTOMATA FOR COMPUTATIONAL NETWORKS

This application is a Continuation of application Ser. No. 07/721,750, filed Jun. 26, 1991, now abandoned.

TECHNICAL FIELD OF THE INVENTION

The invention relates generally to computational networks, and more particularly relates to cellular automata for assembling computational networks. In even greater particularity, three cellular automata—an excitory E-Cell, an inhibitory I-Cell, and a delta D-Node (built from a combination of E- and I-Cells)—can be used to design and assemble parallel processing networks for such applications as signal processing and artificial intelligence.

BACKGROUND OF THE INVENTION

Cellular automata are computational logic cells that form the building blocks for cellular computational networks (or cellular automatom). Such cellular networks are commonly used as the computational engines for implementing parallel processing operations.

A cellular network is an interconnection of identical logic cells, where a cell is a finite state machine. Each cell receives inputs from a finite set of neighbor cells, and possibly from an external source. All cells compute one output simultaneously each clock cycle, with each cell providing its output also to a set of neighbor cells, and possibly to an external receiver.

The specific problem to which the invention has application is the design of new cellular automata that can be assembled into cellular networks for parallel processing. These cellular automata should be useful in the design and assembly of complex cellular networks for such applications as signal processing and artificial intelligence.

A large body of problems in signal processing and artificial intelligence can only be solved computationally by exploiting significant amounts of parallelism. The computational approach to these problems typically involves performing such tasks as graph searching and spatial filtering which are particularly amenable to parallel processing.

For a number of these applications, cellular automata have been assembled into computer architectures for parallel processing. Recently, interest in computer architectures based on cellular automata has increased because of the significant potential for VLSI implementations.

However, initial attempts to use cellular automata assembled into linear systems for parallel processing have failed to meet expectations, and useful artificial intelligence problems remain for the most part computationally intractable. These systems have been found to be limited by their structures in the degree of parallelism they can practically achieve.

One common application for parallel processing systems is to solve artificial intelligence problems involving graph searching. Graph searching is required in a wide variety of artificial intelligence applications, including: Data base search, speech recognition (dynamic time warping), financial forecasting, operation management, trajectory planning, natural language interfaces, and learning systems.

Another typical application for parallel processing is two-dimensional spatial filtering such as for image recognition applications.

Accordingly, a need exists for new cellular automata that can be assembled into cellular computational networks, such as for implementing graph searching and spatial filtering in signal processing and artificial intelligence applications that use parallel processing.

SUMMARY OF THE INVENTION

The invention is a set of cellular automata for assembling computational networks: (a) an excitory E-Cell, (b) an inhibitory I-cell, and (d) a delta D-Node built from a combination of E- and I-Cells. The cellular automata can be used to design and assemble parallel processing networks for such applications as signal processing and artificial intelligence.

In one aspect of the invention, the cellular automata include an excitory E-Cell and an inhibitory I-Cell.

The E-Cell is characterized by a cell state vector $V_{EC}$. It receives a plurality of inputs $x_n$ with the values $\{-1, 0, +1\}$, and provides a single output $y_0$ with the values $\{0, -1\}$. The output $y_0$ and the cell state vector $V_{EC}$ are determined in accordance with the following relationship:

$$\text{If} \left( \sum_{i=0}^{n-1} x_i > 0 \right)$$

$$\{$$
$$V_{EC} = V_{EC} + 1;$$
$$\text{If } (V_{EC} < 0)$$
$$\quad y = -1;$$
$$\text{Else}$$
$$\quad y = 0;$$
$$\}$$

$$\text{Else If} \left( \sum_{i=0}^{n-1} x_i == 0 \right)$$

$$\{$$
$$V_{EC} = V_{EC};$$
$$y = 0;$$
$$\}$$

$$\text{Else If} \left( \sum_{i=0}^{n-1} x_i < 0 \right)$$

$$\{$$
$$V_{EC} = V_{EC} - 1;$$
$$\text{If } (V_{EC} < 0)$$
$$\quad y = -1;$$
$$\text{Else}$$
$$\quad y = 0;$$
$$\}.$$

The inhibitory I-Cell is characterized by a cell state vector $V_{IC}$. It receives a plurality of inputs $x_n$ with the values $\{-1, 0, +1\}$, and provides a single output $y_0$ with the values $\{0, +1\}$. The output $y_0$ and the cell-state vector $V_{IC}$ are determined in accordance with the following relationship:

$$\text{If} \left( \sum_{i=0}^{n-1} x_i > 0 \right)$$

$$\{$$
$$V_{IC} = V_{IC} + 1;$$
$$\text{If } (V_{IC} < 0)$$
$$\quad y = +1;$$
$$\text{else}$$
$$\quad y = 0;$$
$$\}$$

$$\text{Else If} \left( \sum_{i=0}^{n-1} x_i == 0 \right)$$

$$\{$$

-continued
$$V_{IC} = V_{IC};$$
$$y = 0;$$
}

Else If $\left( \sum_{i=0}^{n-1} x_i < 0 \right)$

{
$\quad V_{IC} = V_{IC} - 1;$
$\quad$ If $(V_{IC} < 0)$
$\quad\quad y = -1;$
$\quad$ Else
$\quad\quad y = 0;$
}.

In another aspect of the invention, the cellular automata includes a delta D-node that receives inputs $x_0$ and $x_1$, and provides an output $y_0$. The D-node is built from a single inhibitory I-Cell $I_0$, and three excitory E-Cells $E_0$, $E_1$, and $E_2$. The I-Cell $I_0$ is characterized by a cell state vector voltage of $V_{IC}=0$. The E-Cells $E_0$ and $E_1$ are characterized by a cell state vector voltage of $V_{EC}=0$, and the E-Cell $E_2$ is characterized by a cell state vector voltage of $V_{EC}>0$.

The D-Node is configured such that (a) $x_0$ is applied to $I_0$, and to two inputs of $E_0$, (b) $x_1$ is applied to $I_0$, and to two inputs of $E_1$, (c) $E_0$ and $E_1$ also receive as inputs the output of $I_0$, (d) a fourth input to each of $E_0$ and $E_1$ is the fed back output $y_0$, (e) the outputs of $E_0$ and $E_1$ provide the inputs to $E_2$, and (f) the output of $E_2$ provides the D-Node output $y_0$.

In an exemplary embodiment of the invention, the E-Cell and the I-Cell both comprise summer logic, cell state vector logic and output logic. The summer logic sums the inputs $x_0$, $x_1$, ... $x_n$, and outputs an indication that the sum is either greater than, less than, or equal to zero. In response to the output of said summer logic, cell state vector logic respectively either increments, decrements, or does not modify the cell state vector. In response to the output of the cell state logic, output logic outputs (a) for the E-Cell a –1 and for the I-Cell a +1 if the cell state vector is less than zero, and (b) otherwise a zero.

The cellular automata can be used to assemble computational networks, such as a graph-search network that is isomorphic to the graph structure, a tree-search network that is isomorphic to the tree structure, and a lateral inhibition network. An exemplary graph-search network uses D-nodes with the cell state vectors for the constituent E/I-Cells being selected to provide appropriate path weights, while an exemplary tree-search network uses E-Cells and I-Cells with the cell state vectors being selected to provide appropriated branch weights.

The technical advantages of the invention include the following. The set of three cellular automata—excitory E-Cell, inhibitory I-Cell, and delta D-node—can be used to assemble a wide variety of computational networks, in particular graph-search and tree-search networks in which the networks are made isomorphic respectively to the graph and the tree structures. The E- and I-Cells can be assembled from standard logic circuit building blocks, and the D-node can be assembled from E- and I-Cells.

BRIEF DESCRIPTION OF THE DRAWINGS

For a more complete understanding of the invention, and for further features and advantages, reference is now made to the following Detailed Description of an exemplary embodiment of the invention, taken in conjunction with the accompanying Drawings, in which.

DETAILED DESCRIPTION OF THE INVENTION

The Detailed Description of an exemplary embodiment of the cellular automata—the E-Cell, the I-Cell, and the D-Node—as well as exemplary cellular network implementations of these cellular automatum, is organized as follows:

1. Cellular Automata
  1.1. The Excitory E-Cell
  1.2. The Inhibitory I-Cell
  1.3. The Delta D-Node
2. Cell Circuit Implementation
3. Exemplary Cellular Networks
  3.1. Lateral-Inhibition Network
  3.2. Tree-Search Network
  3.3. Graph-Search Network
4. Parallel Processing Performance
5. Conclusion The exemplary cellular automata are used in exemplary lateral-inhibition, tree-search, and graph-search networks for such applications as signal processing and strategy applications. However, the invention has general applicability to the design of cellular networks using one or more of the cellular automatum.

1. Cellular Automata. The cellular automata are of three types: (a) an excitory or E-Cell; (b) an inhibitory or I-Cell; and (c) a delta or D-Node that is built from a combination of E- and I-Cells.

These cells can be used in the analysis, design, and assembly of cellular computational networks. For example, by configuring such cellular networks to have a similar structure to the graph or algorithm being examined, relatively complex computational networks can be designed and assembled.

This approach to cellular network design is adaptable to a wide variety of applications, including parallel processing architectures for use in signal processing and artificial intelligence. For example, in the area of signal processing, cellular networks can be designed to perform spatial filtering for image processing applications (such as extracting information from an image for input to an artificial intelligence system performing image recognition). In the area of artificial intelligence, cellular networks can be designed to perform best-path analysis for robotics systems.

Figure 1A:
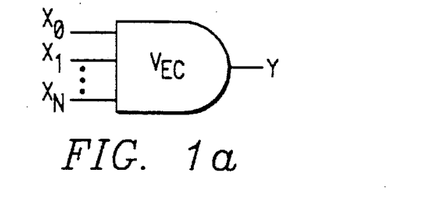
FIGS. 1a and 1b respectively illustrate a generic excitory E-Cell and an exemplary E-Cell.

1.1. The E-Cell. FIG. 1a functionally illustrates the excitory or E-Cell. The E-Cell receives inputs $x_0$, $x_1$, to $x_n$, and produces a single output y. The inputs may be provided by the cell's neighbors or from an external source.

The inputs to the E-Cell take on the values $\{-1, 0, 1\}$. The current state of the E-Cell is defined by the cell state vector $V_{EC}$ which takes on the values $\{\ldots, -1, 0, 1, \ldots\}$. The output y takes on the values $\{-1, 0\}$.

The output y and the cell state vector $V_{EC}$ are determined according to the following algorithm:

If $\left(\sum_{i=0}^{n-1} x_i > 0\right)$

{
$V_{EC} = V_{EC} + 1$;
If $(V_{EC} < 0)$
  $y = -1$;
Else
  $y = 0$;
}

Else If $\left(\sum_{i=0}^{n-1} x_i = 0\right)$

{
$V_{EC} = V_{EC}$;
$y = 0$;
}

Else If $\left(\sum_{i=0}^{n-1} x_i < 0\right)$

{
$V_{EC} = V_{EC} - 1$;
If $(V_{EC} < 0)$
  $y = -1$;
Else
  $y = 0$;
}

Figure 1B:
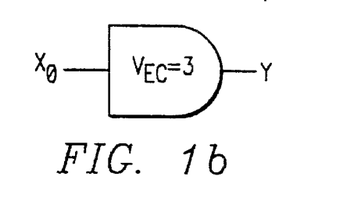

Referring to FIG. 1b, as an example of E-Cell operation, assume an E-Cell with one input $x_0$ and $V_{EC}=3$. When a series of excitatory signals $\{-1, -1, \ldots\}$ are applied, the following time course results, where n is an interval and v(n) is the cell state vector for the current state:

| n | xo(n) | v(n) | y(n) |
|---|-------|------|------|
| 0 | 0     | 3    | 0    |
| 1 | −1    | 2    | 0    |
| 2 | −1    | 1    | 0    |
| 3 | −1    | 0    | 0    |
| 4 | −1    | −1   | −1   |
| 5 | −1    | −2   | −1   |

Thus, at time interval n=0 the cell state vector starts out at 3, and the output is 0. After three excitory −1 inputs at time intervals n=1,2,3, the cell state vector voltage is decremented to 0, and the output is still 0. At the next time interval n=4, an excitory −1 input decrements the cell state vector voltage to −1, and the output switches to −1. Thus, the E-Cell acts like memory in that it can produce and store different values.

Figure 2A:
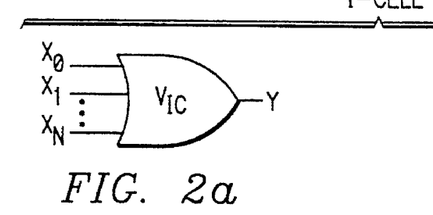
FIGS. 2a and 2b respectively illustrate a generic inhibitory I-Cell and an exemplary I-Cell.

1.2. The I-Cell. FIG. 2a functionally illustrates the inhibitory or I-Cell. The I-Cell receives inputs $x_0$, $x_1$, to $x_n$, and produces a single output y. The inputs may be provided by the cells neighbors or from an external source.

The inputs to the I-Cell take on the values $\{-1, 0, 1\}$. Associated with the cell is a cell state vector $V_{IC}$, taking on the values $\{\ldots, -1, 0, 1 \ldots\}$. The output y takes on the values $\{0, 1\}$.

The determination of the output and updating of the cell state vector $V_{IC}$ are determined according to the following algorithm:

If $\left(\sum_{i=0}^{n-1} x_i > 0\right)$

{
$V_{IC} = V_{IC} + 1$;
If $(V_{IC} < 0)$
  $y = +1$;
else
  $y = 0$;
}

Else If $\left(\sum_{i=0}^{n-1} x_i = 0\right)$

{
$V_{IC} = V_{IC}$;
$y = 0$;
}

Else If $\left(\sum_{i=0}^{n-1} x_i < 0\right)$

{
$V_{IC} = V_{IC} - 1$;
If $(V_{IC} < 0)$
  $y = +1$;
Else
  $y = 0$;
}

Figure 2B:
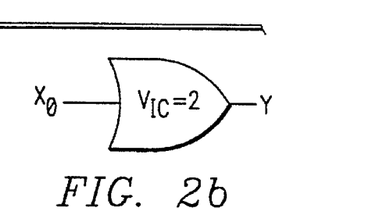

Referring to FIG. 2b, as an example of E-Cell operation, assume an I-Cell with one input $x_0$ and $V_{IC}=3$. When a series of excitatory signals $\{-1, -1, \ldots\}$ are applied, the following time course results, where n is an interval and v(n) is the cell state vector for the current state:

| n | xo(n) | v(n) | y(n) |
|---|-------|------|------|
| 0 | 0     | 3    | 0    |
| 1 | −1    | 2    | 0    |
| 2 | −1    | 1    | 0    |
| 3 | −1    | 0    | 0    |
| 4 | −1    | −1   | +1   |
| 5 | −1    | −2   | +1   |

Thus, at time interval n=0 the cell state vector starts out at 3, and the output is 0. After three excitory −1 inputs at time intervals n=1,2,3, the cell state vector voltage is decremented to 0, and the output is still 0. At the next time interval n=4, an excitory +1 input decrements the cell state vector voltage to +1, and the output switches to +1. Thus, like the E-Cell, the I-Cell acts like memory in that it can produce and store different values.

Figure 3:
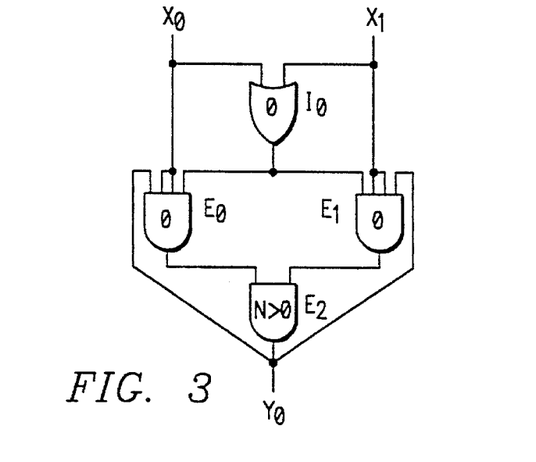
FIG. 3 illustrates a delta D-Node assembled from one I-Cell and three E-Cells.

1.3. The D-Node. FIG. 3a functionally illustrates an exemplary delta or D-Node. The D-Node is built from a single inhibitory I-Cell $I_0$, and three excitory E-Cells $E_0$, $E_1$, and $E_2$. The cell state vector voltage for $I_0$ is $V_{IC}=0$. The vector cell voltage for $E_0$ and $E_1$ is $V_{EC}=0$, and for $E_2$ is $V_{EC}>0$.

The D-Node receives inputs $x_0$ and $x_1$, and provides a single output $y_0$. The input $x_0$ is applied to the inhibitory cell $I_0$, and to two inputs of the excitory cell $E_0$. The input $x_1$ is applied to the $I_0$, and to two inputs of the excitory cell $E_1$. The excitory cells $E_0$ and $E_1$ also receive as inputs the output of $I_0$. The fourth input to each of $E_0$ and $E_1$ is the fed back output of the D-Node $y_0$. The outputs of $E_0$ and $E_1$ provide the inputs to excitory cell $E_2$, which provides the D-Node output $y_0$.

To illustrate the function performed by this Node, suppose that a sequence $\{-1, -1, \ldots\}$ is input at $x_1$. This input drives an I-Cell $I_0$, which in turn increases the cell state vector voltage $V_{EC}$ of E-Cell $E_0$. It also drives $E_1$, which drives $E_2$, and thus decreases the $V_{EC}$ of $E_2$.

The feedback from $E_2$ to $E_0$ cancels the effect of $I_0$ once the $V_{EC}$ of $E_2$ is equal to zero. Thus, the D-Node is capable of self regulation by transferring state information from $E_1$ to $E_0$ or $E_1$, and regulating this transfer.

2. Cell Circuit Implementation. The circuit implementation of the exemplary E-Cell and I-Cell, and therefore the D-Node, is straightforward using standard TTL gates.

Figure 4:
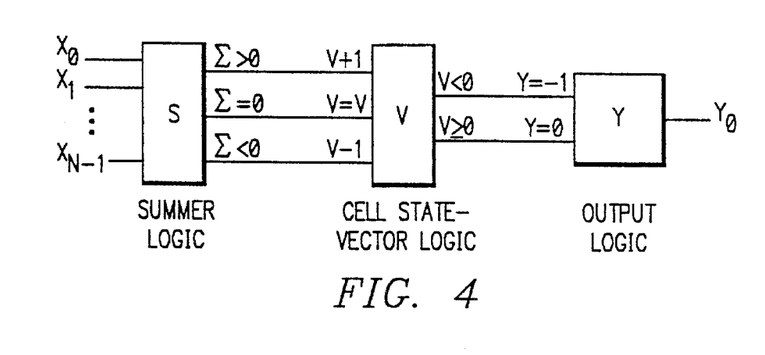
FIG. 4 illustrates an exemplary circuit implementation of an E-Cell.

FIG. 4 illustrates an implementation for an E-Cell—the implementation for the I-Cell is analogous, except that when the cell state vector voltage is less than one the output is inhibitory (+1) instead of excitory (−1).

Summer logic S sums the inputs $x_0, x_1, \ldots x_n$, and determines if the sum is either greater than, less than, or equal to zero.

Based on the output of the summer logic, cell state vector logic V respectively either increments, decrements, or does not modify the cell state vector.

For the E-Cell, based on the output of the cell state logic, output logic Y outputs an excitory −1 if V<0, and otherwise outputs zero. For the I-Cell, the output logic outputs an inhibitory +1 if V<0, and otherwise outputs a zero.

Regarding driving the cell state voltage to a particular value, the recommended approach is to use an auxiliary network made up of similar cells—for example, a network that drives the primary network to a particular state. An alternative approach, particularly suitable for multi-processors, is to have a host processor broadcast the appropriate cell state voltages to the processors that implement the cells.

The architecture of all of these cells could lend them to some novel semiconductor implementations. The use of summation, threshold, and state-vector (threshold) has similarities with the function of a transistor. Thus, these functions could be implemented using transistors operating in non-linear and linear ranges.

Some applications might best be served with slightly more elaborate cells. These could include an ALU, program counter, and a modest instruction set. Making these units programmable would allow for a more general purpose element. Other possible variations include implementing binary logic and cells with state vectors taking on only two states.

3. Exemplary Cellular Networks. Cellular network design using the exemplary cellular automata can be used to analyze, design, and assemble a wide variety of cellular networks. Strictly by way of example, the design of cellular networks is described in connection with a lateral-inhibition network, a tree-search network, and a graph search network.

These networks illustrate general cellular design considerations. The description is given in the context of graph theory. Such an approach is advantageous in that it provides a simple pictorial representation—such an approach can be generalized to an approach based upon matrix representations.

Figure 5A:
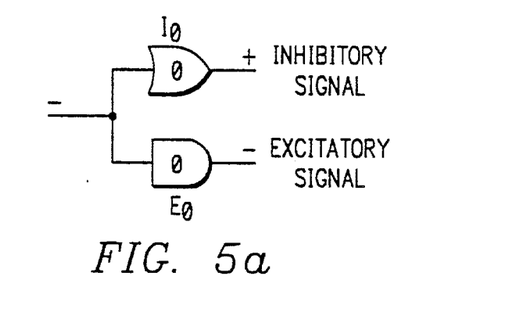
FIGS. 5a and 5b respectively illustrate an elementary combination of an E-Cell and an I-Cell, and a lateral-inhibition cellular network formed from E- and I-Cells.
Figure 5B:
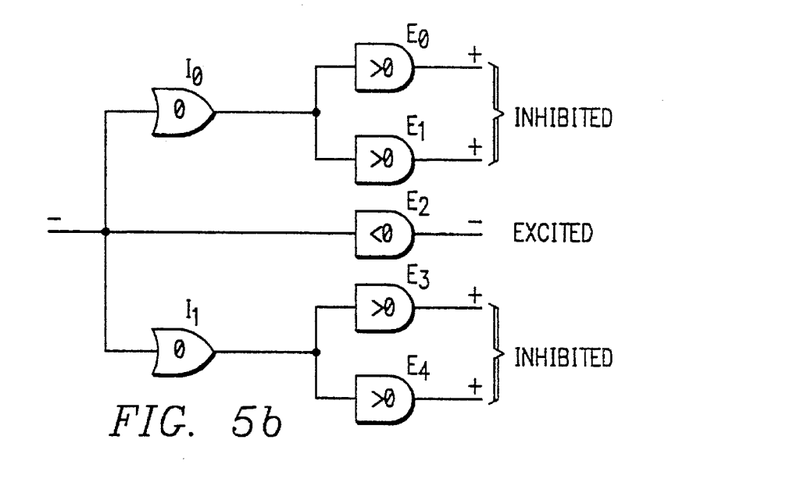

3.1. Lateral-Inhibition Network. FIGS. 5a and 5b illustrate an application of the cellular automata in implementing a lateral-inhibition network using both excitory and inhibitory cells.

Referring to FIG. 5a, excitory and inhibitory cells $E_0$ and $I_0$ can be combined so that a single input signal will both excite and inhibit. Thus, an input excitory signal (−) produces an excitory output (−) from $E_0$, and an inhibitory output (+) from $I_0$.

Referring to FIG. 5b, this principal can be used to assemble a lateral-inhibition network. This network includes two inhibitory cells $I_0$ and $I_1$, and five excitory cells $E_0$–$E_1$. The cell state vector voltage for both $I_0$ and $I_1$ is zero. The cell state vector voltages for $E_0$–$E_4$ and $E_3$–$E_4$ are all greater than zero (inactive state), while the cell state vector voltage for $E_2$ is less than zero (active state).

An excitory signal input (−) is applied (a) through $I_0$ to $E_0$ and $E_1$, through $I_1$ to $E_3$ and $E_4$, and (c) directly to $E_2$. The resulting network outputs from $E_0$–$E_1$ and $E_3$–$E_4$ are inhibited (+) while the output from $E_2$ is excited (−).

The lateral-inhibition network can be used to integrate and sharpen spatial signals. For example, it has been proposed to perform image filtering and feature extraction as performed by the retina.

3.2. Tree-Search Network. FIGS. 6a–6h illustrate an application of the cellular automata in implementing a tree search algorithm using a network of E-Cells. In this example, the structure of the E-Cell network is isomorphic to the tree structure.

Figure 6A:
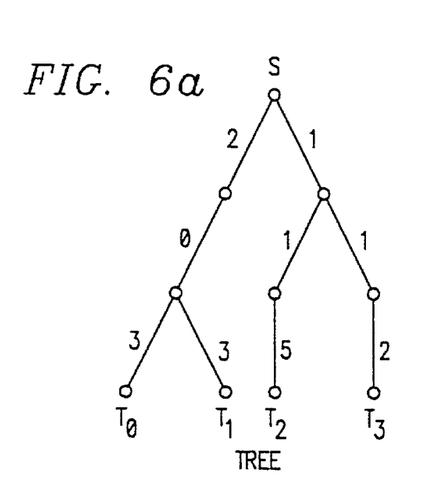
FIGS. 6a and 6b respectively illustrate an exemplary tree structure and an exemplary E-Cell implementation of a corresponding cellular tree-search network.
Figure 6B:
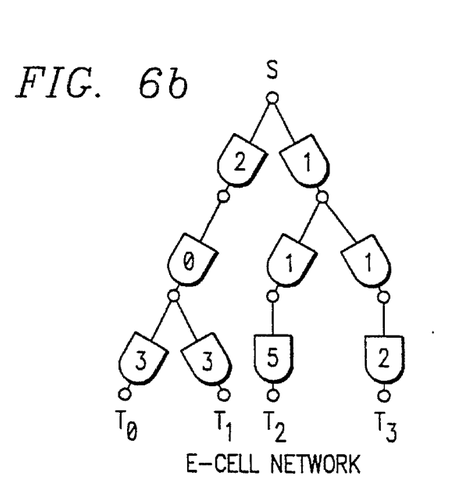
Figure 6C:
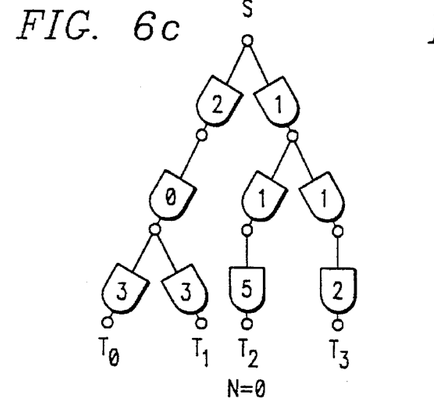
FIGS. 6c, 6d, 6e, 6f, 6g and 6h illustrate an application of the E-Cell tree-search network in computing a minimum cost path.
Figure 6D:
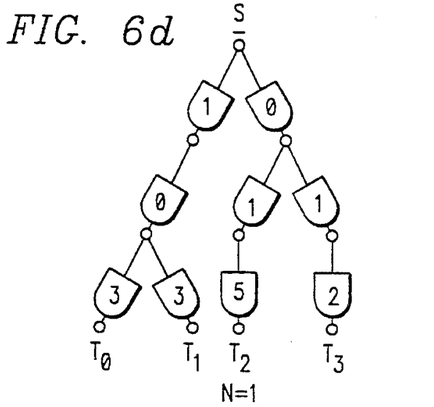
Figure 6E:
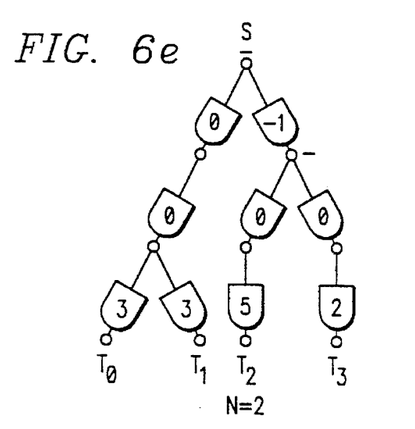
Figure 6F:
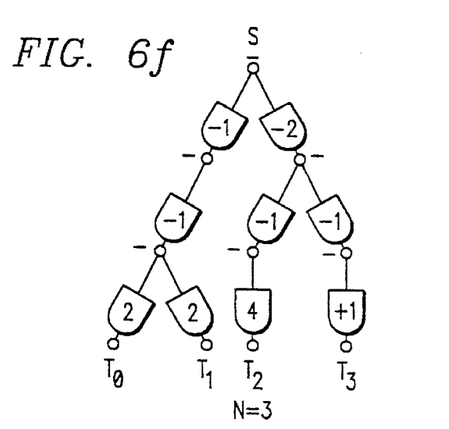
Figure 6G:
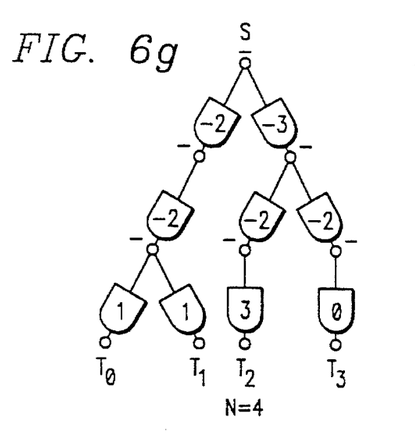

Referring to FIGS. 6a and 6b, a tree structure is implemented using an equivalent E-Cell network. The single input to the tree is at the start node S, and the four outputs of the tree search network are available from the terminal nodes $T_0$–$T_3$. The respective weights of the branches of the tree are stored into the corresponding E-Cells as respective cell state vector voltages.

A series of excitatory signals $\{-1, -1 \ldots \}$ drives the start node S of the E-Cell network. In accordance with the E-Cell algorithm, when a terminal node $T_n$ has a non-zero output, then the minimum cost path has been found.

Referring to FIGS. 6c–6h, the operation of the tree-search network is illustrated by the derivation of one solution to arriving at a minimum cost path in five clock cycles (unit time steps) n. Each FIGURE illustrates the state of the tree-search network at a respective one of the six clock cycles n=0–5.

A (+) is used to represent an inhibitory signal of +1, and a (−) is used to represent an excitory signal of −1. In each FIGURE, the cell state vectors shown represent the current state. These states may be arrived at in a number of ways, such as using the prior set-up procedure described above.

Figure 6H:
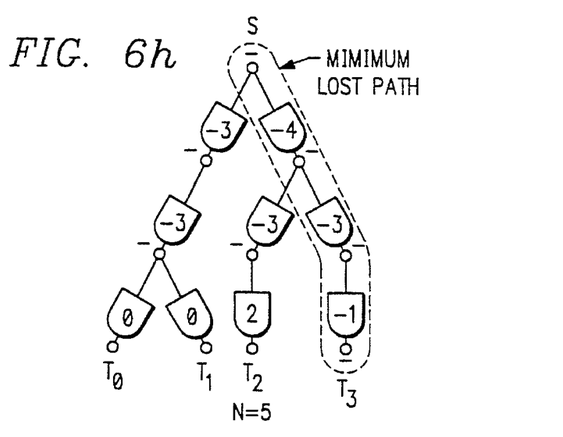

At time n=5, a minimum cost path has been found, and is available at terminal node $T_3$.

3.3. Graph-Search Network. FIGS. 7a–7e illustrate an application of the cellular automata in implementing a graph-search algorithm using D-Nodes. Again, the graph-search network is isomorphic to the graph of interest.

Figure 7A:
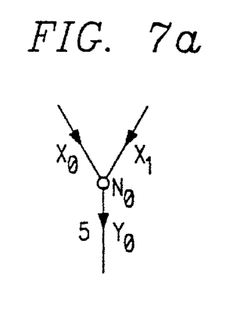
FIGS. 7a, 7b, 7c, 7d, and 7e illustrate the design of an exemplary graph-search network using D-Nodes.

Referring to FIG. 7a, a single graphical element $N_0$ has two inputs $x_0$ and $x_1$ and a single output $y_0$. The graphical element has a path weight of 5.

Figure 7B:
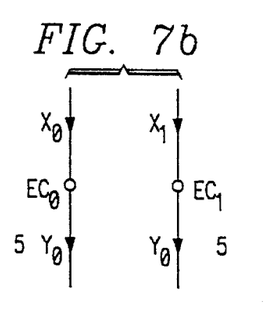

FIG. 7b illustrates an implementation of this graphical element using two E-Cells $EC_0$ and $EC_1$ with respective inputs $x_0$ and $x_1$ and outputs $y_0$ and $y_1$. Each E-Cell is set to the path weight of 5. However, for even a moderate sized graph, this E-Cell design could result in an explosion in the number of cells necessary to implement a graph-search network.

Figure 7C:
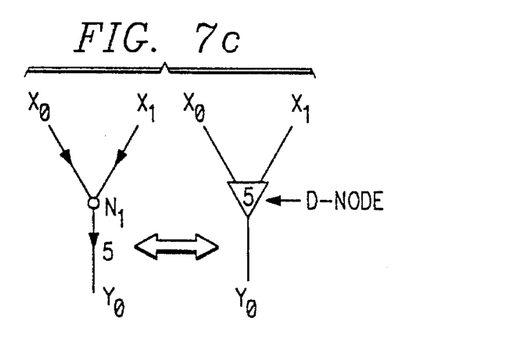

FIG. 7c illustrates an alternative implementation of the graphical element using a single D-Node with respective inputs $x_0$ and $x_1$ and outputs $y_0$ and $y_1$. The cell state vector of the D-Node is set to the path weight 5.

Figure 7D:
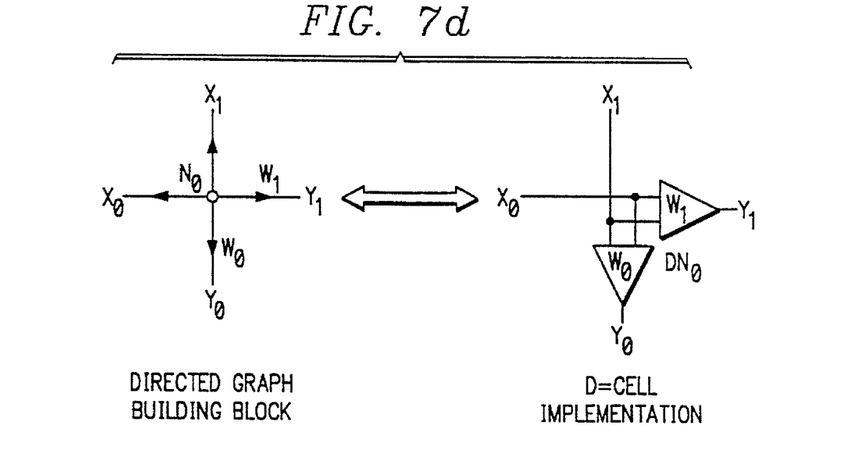
Figure 7E:
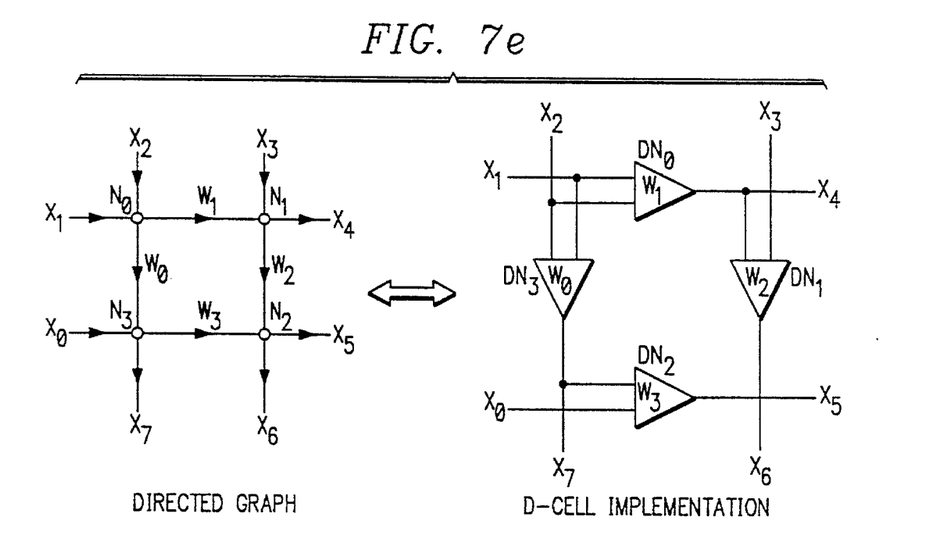

Referring to FIGS. 7d–7e, the D-Node is used to implement a directed graph constructed on a two-dimensional euclidean grid. FIG. 7d illustrates a graphical element $N_0$ implemented using two D-Nodes $DN_0$ and $DN_1$ with respective weights $W_0$ and $W_1$—both of the inputs $x_0$ and $x_1$ are applied to each D-Node which respectively provide the outputs $y_0$ and $y_1$.

FIG. 7e illustrates the D-Node implementation of a section of a graphical matrix. The matrix includes graphical elements $N_0$–$N_3$ with four inputs $x_0$–$x_3$ and four outputs $x_4$–$x_7$. The path weights are $W_0$–$W_3$. The D-Node implementation uses four D-Nodes $DN_0$–$DN_3$ with respective cell state vectors corresponding to the path weights $W_0$–$W_1$. The D-Nodes $DN_0$ and $DN_3$ receive the inputs $x_1$ and $x_2$, while the D-Nodes $DN_1$ and $DN_2$ receive respectively inputs $x_3$ and $x_0$ and respectively the outputs of $DN_0$ and $DN_3$.

Thus, the effect of this approach to implementing a graph-search network is that the network of cellular automata has the same structure as the graph under analysis.

4. Parallel Processing Performance. The cellular automata can be used in designing cellular computational networks that are able to exploit significant amounts of performance-enhancing parallelism.

As an example, consider the complexity of a max-flow algorithm. The max-flow algorithm is the best approach currently available for finding the minimum cost path through a directed graph from a start to a terminal vertex. On a serial machine it has a run time proportional to $|V|^3$ where $|V|$ is the number of vertices in the graph.

In contrast, for a graph-search cellular network implemented using D-Nodes, the run time of a search is proportional to $|V|$. This assumes that the graph-search network is designed to be isomorphic to the graph being searched.

As illustrated by the following table, in comparison with a serial machine, a cellular network design is able to achieve a significant reduction in run time.

| $|V|$ | Max-Flow Run Time | Cell-Net Run Time |
|---|---|---|
| 1 | 1 | 1 |
| 2 | 8 | 2 |
| 8 | 512 | 8 |
| 512 | $1.3 \times 10^8$ | 512 |

Thus, a direct correspondence exists between the size of the graph $|V|$ and the cellular network implementation using D-Nodes, i.e., allowing the graph to be implemented in hardware for optimum performance.

5. Conclusion. Although the Detailed Description of the invention has been directed to certain exemplary embodiments, various modifications of these exemplary embodiments, as well as alternative embodiments, will be suggested to those skilled in the art. For example, the regular structure of these elements makes it possible to implement graph-search arrays of these cells much like memory cells. The cells would be made addressable, thus providing the user with the ability to configure graph weights so as to match a variety of graph structures. It would be useful in some applications to integrate address or content addressable memory onto the cells, placing the computer into the memory, and significantly reducing the Von-Neumann bottleneck.

It is to be understood that the invention encompasses any modifications or alternative embodiments that fall within the scope of the appended claims.

What is claimed:

1. A graph-search network assembled from cellular automata, comprising:

a graph-search network configured from appropriately intercoupled D-node cellular automata arranged to be isomorphic to a preselected graph structure;

said D-node cellular automata being configured from cellular automata that are an excitory E-Cell and inhibitory I-Cell;

said delta D-node receiving inputs, $x_0$ and $x_1$, and providing an output, $y_0$;

said D-node being assembled from an inhibitory I-Cell, $I_0$, and three excitory E-Cells, $E_0$, $E_1$, and $E_2$; and said D-Node being configured such that (a) $x_0$ is applied to $I_0$ and to two inputs of $E_0$, (b) $x_1$ is applied to $I_0$ and to two inputs of $E_1$, (c) $E_0$ and $E_1$ also receive as inputs the output of $I_0$, (d) a fourth input to each of $E_0$ and $E_1$ is the fed back output $y_0$, (e) the outputs of $E_0$ and $E_1$ provide the inputs to $E_2$, and (f) the output of $E_2$ provides the D-Node output $y_0$;

said E-Cell receives a plurality of inputs, $x_n$, each with an input value of $-1$, $0$, or $+1$ and provides a single output, $y_0$, with an output value of $0$, or $-1$ that is determined in accordance with the following state vector and input functional relationships:

$$\text{If } ( \sum_{i=0}^{n-1} S_{x_i} > 0)$$
$$\{$$
$$V_{EC} = V_{EC} + 1;$$
$$\text{If } (V_{EC} < 0)$$
$$y = -1;$$
$$\text{Else}$$
$$y = 0;$$
$$\}$$
$$\text{Else If } ( \sum_{i=0}^{n-1} S_{x_i} = 0)$$
$$\{$$
$$V_{EC} = V_{EC};$$
$$y = 0;$$
$$\}$$
$$\text{Else If } ( \sum_{i=0}^{n-1} S_{x_i} < 0)$$
$$\{$$
$$V_{EC} = V_{EC} - 1;$$
$$\text{If } (V_{EC} < 0)$$
$$y = -1;$$
$$\text{Else}$$
$$y = 0;$$
$$\}; \text{ and}$$

said I-Cell receives a plurality of inputs, $x_n$, each with an input value of $-1$, $0$, or $+1$ and provides a single output, $y_0$, with an output value of $0$, or $+1$ that is determined in accordance with the following state vector and input functional relationships:

$$\text{If } ( \sum_{i=0}^{n-1} S_{x_i} > 0)$$
$$\{$$
$$V_{IC} = V_{IC} + 1;$$
$$\text{If } (V_{IC} < 0)$$
$$y = +1;$$
$$\text{else}$$
$$y = 0;$$
$$\}$$
$$\text{Else If } ( \sum_{i=0}^{n-1} S_{x_i} = 0)$$
$$\{$$
$$V_{IC} = V_{IC};$$
$$y = 0;$$
$$\}$$
$$\text{Else If } ( \sum_{i=0}^{n-1} S_{x_i} < 0)$$
$$\{$$
$$V_{IC} = V_{IC} - 1;$$
$$\text{If } (V_{IC} < 0)$$
$$y = +1;$$
$$\text{Else}$$
$$y = 0;$$

where $V_{EC}$ and $V_{IC}$ are cell state vectors.

2. A computational network assembled from cellular automata, comprising:

a computational network appropriately configured from intercoupled cellular automata, in which the cellular automata are cells, each having
(i) a plurality of inputs with each input having one of a plurality of preselected logical values selected from the group consisting of −1, 0, and +1,
(ii) a single output having one of a plurality of preselected logical values selected from the group consisting of −1, 0, and +1 in response to a value of a state vector,
(iii) a state vector storage circuit for storing said state vector having at least three distinct binary values including the group consisting of −1, 0, and +1, and
(iv) circuitry connected to said plurality of inputs and said state vector storage circuit and operable such that the value of said state vector is
(a) increased by a logical 1 if the sum of the input values is positive,
(b) not changed if the sum of the input values is zero,
(c) decreased by a logical 1 if the sum of the input values is negative.

3. The computational network of claim 2, wherein each of said cells comprise:

an excitory E-Cell or an inhibitory I-Cell; and wherein said single output of said excitory E-Cell, $y_0$, has an output value of 0 or −1 that is generated in accordance with the following state vector and input functional relationships:
(i) if a summation of said plurality of inputs is 0, then said $y_0$ value is 0,
(ii) if a summation of said plurality of inputs is not 0, then said $y_0$ value is 0 if said state vector value is 0, otherwise said $y_0$ value is −1; and wherein said single output of said inhibitory I-Cell, $y_0$, has an output value of 0 or +1 that is generated in accordance with the following state vector and input functional relationships:
(i) if a summation of said plurality of inputs is 0, then said $y_0$ value is 0,
(ii) if a summation of said plurality of inputs is not 0, then said $y_0$ value is 0 if said state vector value is 0, otherwise said $y_0$ value is +1.

4. The computational network of claim 3, wherein said cellular automata further comprises a delta D-node for receiving inputs, $x_0$ and $x_1$, and providing an output, $y_0$;

said D-node being assembled from an inhibitory I-Cell, $I_0$, and three excitory E-Cells, $E_0$, $E_1$, and $E_2$; and said D-node being configured such that (a) $x_0$ is applied to $I_0$ and to two inputs of $E_0$, (b) $x_1$ is applied to $I_0$ and to two inputs of $E_1$, (c) $E_0$ and $E_1$ also receive as inputs the output of $I_0$, (d) a fourth input to each of $E_0$ and $E_1$ is the fed back output $y_0$, (e) the outputs of $E_0$ and $E_1$ provide the inputs to $E_2$, and (f) the output of $E_2$ provide the D-node output $y_0$.

5. The computational network of claim 3, wherein the computational network is a lateral-inhibition network comprising:

inhibitory cells $I_0$ and $I_1$ and excitory cells $E_0$–$E_4$; and said inhibitory and excitory cells being configured such that an excitory signal input is applied
(a) to $I_0$, $I_1$, and directly to $E_2$,
(b) an output of $I_0$ is connected to $E_0$ and $E_1$,
(c) an output of $I_1$ is connected $E_3$ and $E_4$, such that the resulting network outputs from $E_0$–$E_1$ and $E_3$–$E_4$ are inhibited while the resulting output from $E_2$ is excited when the cell state vectors for both $I_0$ and $I_1$ is zero, the cell state vectors for $E_0$–$E_1$ and $E_3$–$E_4$ are all greater than zero, and the cell state vector for $E_2$ is less than zero.

6. The computational network of claim 2, wherein the computational network is a graph-search network that is isomorphic to a preselected graph structure.

7. The computational network of claim 2, wherein the computational network is a tree-search network that is isomorphic to a preselected tree structure.

8. Cellular automata for assembling computational networks, comprising:

an inhibitory and excitory cell, each having
(i) a plurality of inputs with each input having one of a plurality of preselected logical values selected from the group consisting of −1, 0, and +1,
(ii) a single output having one of a plurality of preselected logical values selected from the group consisting of −1, 0, and +1 in response to a value of a state vector,
(iii) a state vector storage circuit for storing said state vector having at least three distinct binary values including the group consisting of −1, 0, and +1, and
(iv) first circuitry connected to said plurality of inputs and said state vector storage circuit and operable such that the value of said state vector is
(a) increased by a logical 1 if the sum of the input values is positive,
(b) not changed if the sum of the input values is zero,
(c) decreased by a logical 1 if the sum of the input values is negative.

9. The cellular automata of claim 8, wherein said excitory E-Cell, further comprises:

said first circuitry connected to said plurality of inputs receives inputs $x_0, x_1, \ldots x_n$, sums those inputs, and outputs an indication that the sum is either greater than, less than, or equal to zero;

said state vector storage circuit comprises cell state logic for incrementing, decrementing, or not changing the cell state vector in response to said indication of said first circuitry; and output logic responsive to the output of the cell state logic as follows:
(i) if a summation of said plurality of inputs is 0, then said output value is 0,
(ii) if a summation of said plurality of inputs is not 0, then said output value is 0 if said state vector value is 0, otherwise said output value is −1.

10. The cellular automata of claim 8, wherein said inhibitory I-Cell, further comprises:

said first circuitry connected to said plurality of inputs receives inputs $x_0, x_1, \ldots x_n$, sums those inputs, and outputs an indication that the sum is either greater than, less than, or equal to zero;

said state vector storage circuit comprises cell state logic for incrementing, decrementing, or not changing the cell state vector in response to said indication of said first circuitry; and output logic responsive to the output of the cell state logic as follows:
(i) if a summation of said plurality of inputs is 0, then said output value is 0, (ii) if a summation of said plurality of inputs is not 0, then said output value is 0 if said state vector value is 0, otherwise said output value is +1.

11. The cellular automata of claim 8, wherein said single output of said excitory E-Cell, $y_0$, has an output value of 0 or −1 that is generated in accordance with the following state vector and input functional relationships:

(i) if a summation of said plurality of inputs is 0, then said $y_0$ value is 0, (ii) if a summation of said plurality of inputs is not 0, then said $y_0$ value is 0 if said state vector value is 0, otherwise said $y_0$ value is −1; and wherein said single output of said inhibitory I-Cell, $y_0$, has an output value of 0 or +1 that is generated in accordance with the following state vector and input functional relationships:

(i) if a summation of said plurality of inputs is 0, then said $y_0$ value is 0, (ii) if a summation of said plurality of inputs is not 0, then said $y_0$ value is 0 if said state vector value is 0, otherwise said $y_0$ value is +1.

12. The cellular automata of claim 11, further comprising:

a delta D-node for receiving inputs, $x_0$ and $x_1$, and providing an output, $y_0$; and wherein said D-node is assembled from an I-Cell, $I_0$, and three E-Cells, $E_0$, $E_1$, and $E_2$; and wherein said cells are configured such that (a) $x_0$ is applied to $I_0$ and to two inputs of $E_0$, (b) $x_1$ is applied to $I_0$ and to two inputs of $E_1$, (c) $E_0$ and $E_1$ also receive as inputs the output of $I_0$, (d) a fourth input to each of $E_0$ and $E_1$ is the fed back output $y_0$, (e) the outputs of $E_0$ and $E_1$ provide the inputs to $E_2$, and (f) the output of $E_2$ provides the D-Node output $y_0$.

13. A cellular automata for assembling computational networks, comprising:

a cell, having (i) a plurality of inputs with each input having one of a plurality of preselected logical values selected from the group consisting of −1, 0, and +1, (ii) a single output having one of a plurality of preselected logical values selected from the group consisting of −1, 0, and +1 in response to a value of a state vector, (iii) a state vector storage circuit for storing said state vector having at least three distinct binary values, including the group consisting of −1, 0, and +1, and (vi) circuitry connected to said plurality of inputs and said state vector storage circuit and operable such that the value of said state vector is (a) increased by a logical 1 if the sum of the input values is positive, (b) not changed if the sum of the input values is zero, (c) decreased by a logical 1 if the sum of the input values is negative.

14. The cellular automata of claim 13, wherein said cell is an excitory cell, and wherein said single output of said excitory E-Cell, $y_0$, has an output value of 0 or −1 that is generated in accordance with the following state vector and input functional relationships:

(i) if a summation of said plurality of inputs is 0, then said $y_0$ value is 0, (ii) if a summation of said plurality of inputs is not 0, then said $y_0$ value is 0 if said state vector value is 0, otherwise said $y_0$ value is −1.

15. The cellular automata of claim 13, wherein said cell is an inhibitory cell, and wherein said single output, $y_0$, has an output value of 0 or +1 that is determined in accordance with the following state vector and input functional relationship:

(i) if a summation of said plurality of inputs is 0, then said $y_0$ value is 0, (ii) if a summation of said plurality of inputs is not 0, then said $y_0$ value is 0 if said state vector value is 0, otherwise said $y_0$ value is +1.

16. A tree-search network assembled from cellular automata, comprising:

cellular automata arranged and intercoupled to be isomorphic to a preselected tree structure;

each cell having (i) a plurality of inputs with each input having one of a plurality of preselected logical values selected from the group consisting of −1, 0, and +1, (ii) a single output having one of a plurality of preselected logical values selected from the group consisting of −1, 0, and +1 in response to a value of a state vector, (iii) a state vector storage circuit for storing said state vector having at least three distinct binary values, including the group consisting of −1, 0, and +1, and (iv) circuit connected to said plurality of inputs and said state vector storage circuit and operable such that the value of said state vector is (a) increased by a logical 1 if the sum of the input values is positive, (b) not changed if the sum of the input values is zero, (c) decreased by a logical 1 if the sum of the input values is negative.

17. The tree-search network of claim 16, wherein said cellular automata, comprise:

an excitory E-Cell or an inhibitory I-Cell; and, wherein said single output of said excitory E-Cell, $y_0$, has an output value of 0 or −1 that is generated in accordance with the following state vector and input functional relationships:

(i) if a summation of said plurality of inputs is 0, then said $y_0$ value is 0, (ii) if a summation of said plurality of inputs is not 0, then said $y_0$ value is 0 if said state vector value is 0, otherwise said $y_0$ value is −1; and wherein said single output of said inhibitory I-Cell, $y_0$, has an output value of 0 or +1 that is generated in accordance with the following state vector and input functional relationships:

(i) if a summation of said plurality of inputs is 0, then said $y_0$ value is 0, (ii) if a summation of said plurality, of inputs is not 0, then said $y_0$ value is 0 if said state vector value is 0, otherwise said $y_0$ value is +1.

\* \* \* \* \*